United States Patent [19]
Furuse et al.

[11] 3,851,275
[45] Nov. 26, 1974

[54] MIRROR SUPPORT STRUCTURE FOR AN INTERNAL MIRROR-TYPE GAS LASER TUBE

[75] Inventors: Takao Furuse; Tohru Matsuoka; Kiyohisa Kato, all of Tokyo, Japan

[73] Assignee: Nippon Electric Company Limited, Tokyo-to, Japan

[22] Filed: Aug. 31, 1973

[21] Appl. No.: 393,491

[30] Foreign Application Priority Data
Sept. 7, 1972   Japan.......................... 47-89730

[52] U.S. Cl..................... 331/94.5 D, 331/94.5 G
[51] Int. Cl............................................. H01s 3/22
[58] Field of Search................................. 331/94.5

[56] References Cited
OTHER PUBLICATIONS

Large & Hill, Applied Optics, Vol. 4, No. 5, May 1965, pp. 625–626.

Roberts et al., Rev. of Scientific Instruments, Vol. 38, No. 8, Aug. 1967, pp. 1105–1107.

Dolgov–Savelev, J. of Applied Spectroscopy, Vol. 12, No. 5, May 1970, pp. 930–933.

Primary Examiner—Ronald L. Wibert
Assistant Examiner—R. J. Webster
Attorney, Agent, or Firm—Sandoe, Hopgood & Calimafde

[57] ABSTRACT

A mirror support structure for an internal mirror-type gas laser tube includes a cylindrical metal member joined at one of its ends to the envelope of the laser tube. The peripheral end of a mirror is bonded to the other end of the cylindrical member with a low melting-point glass.

7 Claims, 3 Drawing Figures

PATENTED NOV 26 1974  3,851,275

MIRROR SUPPORT STRUCTURE FOR AN INTERNAL MIRROR-TYPE GAS LASER TUBE

This invention relates generally to internal mirror-type gas laser tubes, and, more particularly, to a mirror supporting structure suitable for an internal mirror type gas laser tube.

In the fabrication of internal mirror-type gas laser tubes, the mirror installed at each end of the tube must be brought into precise axial alignment with the center of the tube and the mirror must be bonded with the tube end so as to establish a reliable hermetic seal.

Several methods have been proposed and put into practice to establish a hermetic seal of sufficient mechanical strength and integrity between the mirror and the tube end. These methods include the following:

(1) Low-temperature bonding method using an organic bonding material;

(2) Low-temperature bonding method using an inorganic bonding material; and (3) High-temperature bonding method using an inorganic bonding material.

The method (1) employs a plastic bonding material or pitch for bonding. This method is advantageous to achieve axial alignment of the mirror in that dimensionally precise bonds can be established; this method, however, is inappropriate when the bond is to be subjected to a high-temperature baking process, because the bonding material employed in this method is not highly resistant to heat. Degassing from the glass or other components in the tube is thus insufficient and foul gases are liable to be released in the tube as a result of the collision of ions generated by an electric discharge, or as a result of an increase in ambient temperature. This release of the gas purity within the gas laser tube and in a sharp reduction in the tube life. In addition, the aging effects of the bonding material used in this method, which are caused by changes in ambient temperature or in the operating temperature, are significant and cause cracks to form in the bonding material, or cause the bonding material to peel off in thin layers from the junction surface. This gradual destruction of the bonding material results in the leakage of air into the tube and in the deterioration of the gas purity within the tube. Therefore, gas laser tubes utilizing this type of bond cannot be preserved in storage for long periods of time. Laser tubes of this kind may be suitable for experimental use, but they are inadequate for industrial applications.

According to the method (2), a bonding material containing water glass or sodium aluminate phosphate as the principal constituent is used. Since the bonding temperature is below about 300° C, the bonds are highly resistant to heat and dimensionally accurate bonds can be formed in the same manner as in method (1).

The advantages of this second method are, however, considerably offset by the drawbacks inherent to this method, including the extreme difficulty in forming hermetic seals, notably in the case of helium, lack of mechanical sturdiness of the produced bonds, perviousness to moisture, and others. Gas laser tubes containing such bonds are thus suitable only for experimental use.

The method (3) provides a high-temperature bonding method using a low melting-point solder glass. Glass is stable itself against the ambient temperature or atmosphere change. Therefore, dimensionally precise bonds can be made and such bonds are highly resistant to heat and hence can withstand the baking process at high temperatures. Thus, the degassing from glass portions can be sufficiently performed by this method.

As compared with the methods (1) and (2), method (3) requires that the bonds, particularly the one between the mirror and the laser tube envelope, be formed in an electric oven at an extremely high temperature. Therefore, the bond between the tube envelope and mirror should have a softening point much higher than the bond working temperature; that is, the melting temperature of the low melting-point solder glass. Furthermore, the dielectric multilayer film deposited on the glass substrate must be capable of withstanding a temperature higher than the previously mentioned working temperature.

The melting points of low melting-point solder glasses now in use are usually above 400°C. Thus, it is necessary to use bonding materials having a softening point higher than the working temperature, such as special borosilicate glass, high silicate glass, or quartz.

In addition, a substrate that is sufficiently larger in area than the effective area of the mirror must be employed or else the optical characteristics of the mirror will be impaired by thermal damage, making the cost of manufacturing the laser very high.

Since the dielectric multilayer film deposited on the mirror is only capable of withstanding temperatures below 400°C, it will suffer thermal damage and its optical function is lost if this bonding method (3) is used. To avoid this difficulty, the dielectric film must be formed on a glass substrate by evaporation after the substrate has been bonded. This requires complex fabrication processes and additonal process steps which increase the manufacturing cost.

It is an object of the present invention to provide an improved mirror support structure for an internal mirror type gas laser tube which will eliminate the defects of conventional high-temperature bonding methods.

In the improved mirror support structure contemplated by this invention, one end of a flanged cylindrical member preferably made of a ductile metal is joined to one end of the envelope of a gas laser tube. A mirror is installed at the other end of the cylindrical member in a thin-walled portion of the cylindrical member in such a manner that a sufficient circumferential spacing is produced therearound. The peripheral end portion of the mirror is bonded to the free end portion of the thin-walled part of the cylindrical member with a low melting-point glass.

The cylindrical aperture member may, as herein shown, have a flanged joint-like structure including two flange-like projections extending transversely from the side wall thereof so as to facilitate the adjustment of the direction of its axis by utilizing the ductility of the metal, thereby to enable precise optical axial alignment for the mirror.

To the accomplishment of the above, and to such further objects as may hereinafter appear, the present invention relates to a mirror support structure for an internal mirror-type gas laser tube, substantially as defined in the appended claims and as described in the following specification taken together with the accompanying drawing in which:

Figure 1:
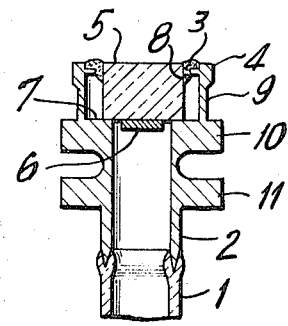
FIG. 1 is a cross-sectional view of a mirror mounting structure according to one embodiment of this invention.

The invention is directed to an improved mirror-mounting structure for use with a gas laser tube which, as shown in FIG. 1, includes a gas envelope 1. A cylindrical apertured member 2 with two flange-like projections 10 and 11 made of a plastic or ductile metal (such as oxygen-free copper) has one of its ends (the lower end in FIG. 1) hermetically bonded to the envelope 1. The opposite or upper end of member 2 includes a thin wall cylindrical portion having a greater interior diameter than the lower end of the cylindrical member. A mirror 5, consisting of a glass substrate and having a dielectric multilayer film 6 deposited on the surface of the glass substrate, is received within the larger diameter, upper end of cylindrical member 2.

As illustrated in the embodiment of FIG. 1, the peripheral portion of the inner end surface of mirror 5 rests on a ledge-like support surface of cylindrical member 2, defined at the portion at which the interior diameter of the cylindrical member increases. The side peripheral portion 8 of mirror 5 and a section that extends radially inwardly from the thin wall portion at the end portion 4 of cylindrical member 2 are bonded together with a low-melting point glass 3 so as to establish a reliable hermetic seal between the mirror and the end portion 4 of the cylindrical member. An annular clearance is formed between the peripheral surface of the mirror 5 and the thin side wall 9 of the hollow cylindrical portion of cylindrical member 2.

When mirror 5 and the hollow cylindrical member are to be bonded together, as mentioned previously, it is necessary that the mirror in the completed state be inserted into the hollow cylindrical member 2 and mounted in the prescribed position. The end portion of the assembly is then subjected to high-frequency induction heating by surrounding the end portion of member 2 with an induction heating coil. The lowmelting point solder glass then begins to melt and the end portion 4 of the cylindrically apertured member 2, the low melting-point glass 3, and the mirror 5 jointly form a hermetic bond. In this case, the solder glass 3 begins to melt by heat produced at the end portion 4 of the member 2 as a result of the high-frequency induction heating and is fused together with the side surface 8 of the mirror 5. The optical flatness and parallelism of the central portion of the mirror thus remains substantially unaffected by this heating process with no residual stress and no impairment of its optical properties. The structure of FIG. 1 thus described above has considerable advantages over the prior method (3) described above in providing an increased effective optical area of the central portion of the mirror 5 for a mirror of the same diameter.

Another advantage of the assembly structure of FIG. 1 is that the dielectric multilayer film 6 is disposed considerably apart from the fused junction of the side surface 8 of the mirror 5, the low melting-point glass 3, and the end portion 4 of the metallic member 2.

Still another advantage of the assembly structure of FIG. 1 is that there is no possibility of the multilayer film 6 being thermally damaged, because the thickness of the side wall 9 of the hollow cylindrical portion is extremely thin, and the heat conductivity from the end portion 4, which is subjected to high-frequency induction heating, to the dielectric multilayer film has been greatly reduced. This permits the mirror 5 in the completed state (that is, with the dielectric multilayer film deposited onto the glass substrate) to be safely mounted in its proper seat despite the induction heating process. This dispenses with the additonal process of evaporating the dielectric multilayer film that is conducted after the glass substrate has established a junction with a low melting-point solder glass, or the like, in the high-temperature bonding method (3). This results in simpler fabrication steps and lower manufacturing costs.

A further advantage of the assembly structure of FIG. 1 is that the junction is highly resistant to heat and is capable of being baked in an oven at high temperatures. Since the glass portions of the laser tube can be sufficiently degassed during the baking process, the likelihood of the degradation of the gas purity within the tube is reduced to a minimum, so that the gas laser tube can be operated for long periods.

A still further advantage of the assembly structure of FIG. 1 resides in the plastic of ductile properties of cylindrical member 2 made of a plastic metal such as oxygen-free copper. The member 2 can be relatively easily deformed by applying an external force and, after the deformation, it can maintain its deformed shape. By holding the two flanges together at a predetermined location with a clamping device, such as a jig, and applying an external force, the spacing of the annular groove between the flanges can be increased or decreased, thereby causing the thin-walled neck portion of member 2 to be suitably bent and the plane of the mirror 5 to be thereby oriented orthogonal to the central axis of the laser tube. This arrangement eliminates the need for preliminary axial alignment between the mirror and the laser tube in case the bonding work, as well as the need for installing complex and expensive bonding equipment.

Figure 2:
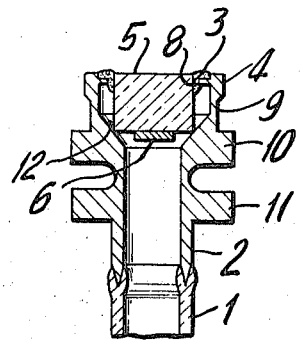
FIG. 2 is a cross-sectional view of a mirror mounting structure according to another embodiment of this invention; and, FIG. 3 is a cross-sectional view of a mirror mounting structure according to still another embodiment of this invention.

Another embodiment of the mirror support structure of the invention is shown in FIG. 2, in which elements corresponding to those of the embodiment of FIG. 1 are identified by corresponding reference numerals.

The embodiment of FIG. 2 is substantially the same as the structure of FIG. 1, except that cylindrical apertured member 2 includes a support 9 on which the mirror 5 is mounted and which is in the form of cone-shaped surface. The periphery of the opposite end of the mirror 5 is in edgewise contact with this cone-shaped surface. Since the contact area of the support is minimized, as compared with the structure of FIG. 1, the quantity of heat transmitted from the end portion 4 of member 2 to the dielectric multilayer film 6 through the side wall portion 9 is significantly reduced when the hermetic junction is formed by a high-frequency induction heating process.

Instead of using a high-frequency induction coil for melting the low melting-point glass 3, as mentioned previously, the end portion 4 of member 2 may be wound with a heater element for the direct local heating of that portion. Moreover, forced air cooling may be used for the flange portions to protect the dielectric multilayer film 6 from thermal damage.

Figure 3:
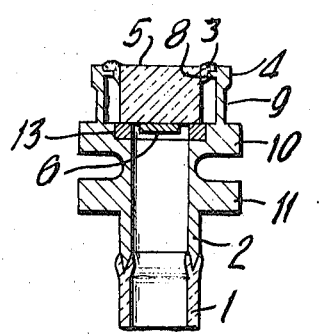

The embodiment of the invention shown in FIG. 3, is similar to the embodiment of FIG. 1, except that it includes a ring-shaped thermal shield 13 made of a substance having a poor thermal conductivity, such as glass or mica, which is disposed as a support for the mirror 5 to protect the dielectric multilayer film 6 from thermal damage.

From the above description of the mirror support structure of the invention it is apparent that the outstanding structural features of the invention are as follows:

(1) A high-temperature bonding method using a low melting-point glass is applicable. Thus, laser tubes can be baked in an oven at high temperatures, and the degradation of the gas purity within the tube can be greatly reduced.

(2) The dielectric multilayer film on the mirror is disposed at a location considerably removed from the junction to be heated by a local heating method, such as high-frequency induction heating, and thus is only slightly affected by the conduction of heat generated in the junction.

Therefore, instead of bonding a glass substrate and then depositing the multilayer film, a completed mirror can be bonded to the cylindrical member as mentioned previously. In addition, the optically effective area in the central portion of the mirror can be increased for the same mirror size, which results in simpler fabrication steps and reduction in mirror diameter.

(3) The cylindrical apertured member, which is made of a plastic or ductile metal, is provided with two flange-like circular projections. This mechanical structure has been found suitable for axial alignment of the mirror. Thus both axial alignment facilities required for the fabrication of the gas laser tube and for the bonding steps become simpler.

It will also be apparent that, although the mirror support structure of the invention has been described and illustrated with respect to several embodiment thereof, variations and modifications thereto can be made without necessarily departing from the spirit and scope of the invention.

What is claimed is:

1. A mirror mounting structure for an internal-mirror type gas laser tube having a pair of mirrors within an envelope, said mounting structure comprising a hollow cylindrical plastic metal member hermetically sealed at one end to said envelope, the other end of said metal member having a section of a greater internal diameter and a thinner wall, and a mirror arranged within said section of said metal member having the greater diameter, the outer peripheral end of said mirror being bonded to said other end of said metal member by a low melting-point glass, said cylindrical metal member having a flange-like portion to permit deformation thereof, whereby said mirror can be brought into alignment with the axis of the laser tube.

2. The mirror mounting structure of claim 1, in which said flange-like portion includes first and second axially spaced circular flanges having an annular groove therebetween.

3. The mirror mounting structure of claim 1, in which said cylindrical metal member includes an interior ledge portion, the lower end of said mirror resting on said ledge portion.

4. The mirror structure of claim 1, in which said thinner wall includes a section extending inwardly from the upper end thereof, said low melting-point glass being adhered to said inwardly extending section and to a portion of the peripheral end of said mirror.

5. The mirror structure of claim 4, in which an annular clearance is defined between said mirror and the said thinner wall below said inwardly extending section.

6. The mirror mounting structure of claim 1, in which said cylindrical metal member includes an inner conical-shaped surface, the outer lower edge of said mirror contacting said conical-shaped surface.

7. The mirror mounting structure of claim 1, in which a thermal shield made of a material having a lower thermal conductivity than the metal of said cylindrical member is arranged in the interior of said cylindrical member, the lower end of said mirror resting only on said thermal shield.

* * * * *